United States Patent [19]

Hyun

[11] Patent Number: 4,798,454
[45] Date of Patent: Jan. 17, 1989

[54] INTEGRAL REAR VIEW MIRROR FOR EYEGLASSES

[76] Inventor: Kwang H. Hyun, 914 S. Ardmore St., Los Angeles, Calif. 90005

[21] Appl. No.: 112,249

[22] Filed: Oct. 23, 1987

[51] Int. Cl.⁴ .............................................. G02C 7/14
[52] U.S. Cl. .................................... 351/50; 351/158; 350/638
[58] Field of Search ................ 351/50, 158; 350/638; 2/448, 449, 450, 13

[56] References Cited

U.S. PATENT DOCUMENTS 3,423,150 1/1969 Freed .............................. 350/638 X Primary Examiner—Rodney B. Bovernick
Attorney, Agent, or Firm—Erik M. Arnhem

[57] ABSTRACT

An integral rear view mirror for eyeglasses comprises an elongated channel formed within at least one temple piece of the eyeglass which supports an elongated rod having an upwardly extending tab. A notch is formed within the elongated channel and serves to lock the rod in a withdrawn position. The outwardly extending end of the rod supports a hinged attachment to a rear view mirror. A spring captivated within the channel urges the rod to the forward position. The mirror is rotatable between a downwardly extending in use position and an upwardly extending position when not being used. In addition, the mirror is rotatable to a position overlaying the most proximate lens of the eyeglasses to facilitate easy carrying of the glasses in the folded position.

6 Claims, 2 Drawing Sheets

INTEGRAL REAR VIEW MIRROR FOR EYEGLASSES

FIELD OF THE INVENTION

This invention relates generally to optical glasses and particularly to rear view mirror structures for use therewith.

BACKGROUND OF THE INVENTION

Through the years, a number of persons have found it desirable or necessary to wear optical glasses of various types. While the structure of such optical glasses varies considerably, the majority comprise a pair of lens pieces which are connected to a common nose piece adapted to be received upon and rest upon the bridge portion of the wearer's nose. A pair of temple pieces comprising elongated, often curved members, are hingeably attached to the outer portions of the lenses or the frame supporting them and are worn along side the user's temple and head and extend behind the user's ear. In many cases, the lenses are tinted to provide sunglasses which aid the user's eye in withstanding extremely bright light.

In many activities in which glasses are worn, a need arises to also provide a rear view capability for the wearer. Persons such as security guards and sentries often have a need for rear view capability. In addition, elderly persons or others having difficulty moving their head in certain activities, may benefit from glasses having a rear view capability. Finally, some activities such as bicycling may be rendered safer by avoiding the need to turn the user's head about for rear view.

The need for such rear view capability in connection with glasses and sunglasses has prompted practitioners in the art to create various structures which provide one or more mirror devices supported upon the glasses frame or temple pieces. One such structure is shown in U.S. Pat. No. 4,105,183 issued Aug. 8, 1978 for a REAR VIEW MIRROR ASSEMBLY sets forth a removably mounted, slideably engageable, pivoting rear view mirror attachment for use on the temple portion of conventional eyeglasses. The structure shown comprises a mirror pivotally coupled to a cylindrical member which in turn is secured to a generally U-shaped temple support member. The position of the mirror is pivoted to provide angular adjustment and slideably positioned upon the temple piece for forward and reverse position adjustment.

Another structure set forth in U.S. Pat. No. 4,603,944 issued Aug. 5, 1986 for an OPTICAL DEVICE FOR AN INDIVIDUAL sets forth an optical device for mounting either a mirror or magnifying lens at a predetermined position in front of a optical glass wearer's eye which the mirror or lens to be adjusted to variable operative positions. An elongated temple support includes a group of downwardly extending fingers adapted to receive an embrace a portion of the temple piece of the optical glasses. The temple support includes an upper hinge portion from which an elongated arm is hingeably attached having a ball and socket joint at the remote end which in turn supports a mirror.

U.S. Pat. No. 3,423,150 issued Jan. 21, 1969 for an EYEGLASS FRAME WITH ADJUSTABLE REAR VIEW MIRRORS sets forth a pair of viewing glasses in which the temple pieces are adapted to include an elongated channel running a substantial portion of their length. The temple pieces are further adapted to extend beyond the hinge portion and an elongated mirror support is adapted to be received within the temple piece channel and the slideable portion therein. One end of the elongated member supports a pivotally secured mirror while the other end supports a knob used in sliding the elongated pieces with respect to the temple piece to adjust mirror position.

Italian Pat. No. 594,364 issued June 1, 1959 for a MIRROR FOR REAR VIEWING sets forth a device for attachment to a conventional pair of glasses in which supports are secured to the temple pieces and frame portions of the glasses. The supports include vertical stand-offs to which a pair of elongated rods are attached so as to extend inwardly and above the lenses of the glasses. A connecting rod having length adjusting means is secured to the inwardly extending rods. A pair of mirrors are attached to the end portions of the extending rods and extend downwardly to the wearer's field of vision. The position of the mirrors is adjusted by the linking rod.

U.S. Pat. No. 4,349,246 issued Sept. 14, 1982 for a REAR VIEW MIRROR WITH SLIT CLIP ATTACHMENT sets forth a rear view mirror for use with conventional glasses including a clip attachment adapted to be received upon the temple piece. The clip comprises an alligator clip-like structure from which an elongated rod-like portion extends outwardly and terminates in a pivotally ball and socket joint. A mirror is coupled to the ball and socket joint and the position of the mirror is adjusted by virtue of pivoting the ball and socket joint.

U.S. Pat. No. 3,988,058 issued Oct. 26, 1976 for a REAR VIEW MIRROR DEVICE FOR ATTACHMENT TO THE ACCESSORIES OF THE USER sets forth a rear view mirror assembly for mounting on various types of apparel such as the frame of eyeglasses, the peak of a cap, a helmet, and so on. The device includes a body having a U-shaped attachment member and an outwardly extending rod portion. The rod portion terminates in a socket which receives a U-shaped member having a socket joint at each end thereof. The U-shaped member is pivotally attached to the socket joint on the rod and supports a mirror on the other socket joint.

French Pat. No. 935,711 issued Feb. 9, 1948 for a REAR VIEW MIRROR FOR GLASSES sets forth an elongated rod having a pair of clamps adapted to attach to the temple piece of an eyeglass support a pivotally attached mirror. The mirror position is adjusted by sliding the support along the temple eyepiece and by pivoting the mirror.

U.S. Pat. No. 2,175,896 issued Oct. 10, 1939 for a REAR VIEW MIRROR FOR EYEGLASSES sets forth several configurations for attaching a mirror to the temple piece or frame of a conventional eyeglass. The attachment includes a slideable rod which supports the mirror in a pivotal attachment.

French Pat. No. 2,532,070 issued Feb. 24, 1984 for a REAR VIEW MIRROR FOR ATTACHMENT TO SPECTACLES sets forth an elongated support rod having clip means for attachment to the temple piece of the eyeglasses. The elongated rod terminates at its forward end in a hinge portion from which a downwardly extending arm is hingeably attached. The downwardly extending arm supports a mirror in a pivotal manner.

While the above-described prior art structures have realized some success in providing rear view mirror capability for eyeglasses and the like, their mechanical structures are often cumbersome and make the use of the eyeglasses more complicated. In addition, the majority of structures shown to date do not readily accommodate the folding of the temple pieces to the closed position in which the glasses may be readily carried within a pocket or glass case in accordance with their normal use without such mirrors.

Their remains therefore, a need in the art for an improved means of attaching a rear view mirror device to eyeglasses which facilitate their transport in the closed position.

SUMMARY OF THE INVENTION

Accordingly, it is a general object of the present invention to provide an improved rear view mirror for eyeglasses. It is a more particular object of the present invention to provide an integral rear view mirror for eyeglasses which facilitates folding of the glasses to their closed position for easy carrying.

In accordance with the invention, there is provided an integral rear view mirror for eyeglasses in which the temple piece of the eyeglass defines an internal channel and in which an elongated rod is supported. The rod extends beyond the channel in the temple piece and supports a mirror in a hinged attachment. A spring supported within the channel biases the rod to an extended position in which the mirror is supported in front of the lens of the eyeglass. The elongated rod is rotatable between positions in which the mirror extends downward or inwardly and lock means cooperate to permit the rod to be drawn into the eyepiece channel and support the mirror in close proximity to the lens of the eyeglasses.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in conjunction with the accompanying drawings, in the several figures of which like reference numerals identify like elements and in which:

DESCRIPTION OF THE PREFERRED EMBODIMENT

Figure 1:
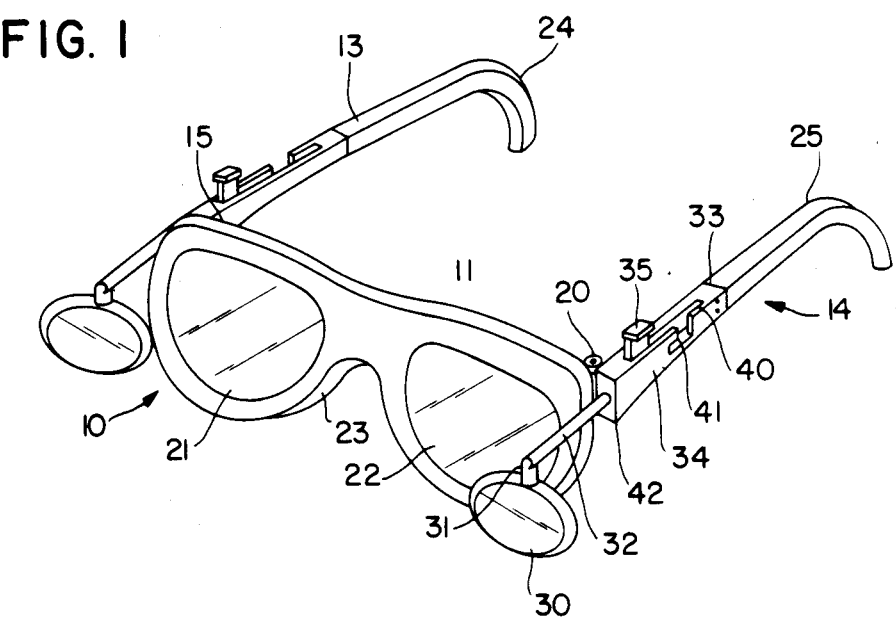
FIG. 1 is a perspective view of an integral rear view mirror for eyeglasses constructed in accordance with the present invention.

FIG. 1 sets forth a perspective view of the present invention integral review mirror in which a pair of eyeglasses generally referenced by numeral 10 comprise a frame 11 supporting a pair of lenses 21 and 22 and defining a nose bridge portion 23. A pair of hinges 15 and 20 are coupled to frame 11 in accordance with conventional eyeglass fabrication techniques. A temple piece 13 constructed in accordance with conventional eyeglass fabrication includes a curved ear piece 24. Hinge 15 secures temple piece 13 to frame 11 in a pivotal or hinged attachment which, in accordance with conventional fabrication techniques, permits temple piece 13 to be configured as shown in FIG. 1 or alternatively to be folded inwardly and rest against frame 11 for storage or transport.

In accordance with the invention, a temple piece 14 includes an ear piece 25 having a curved portion similar to ear piece 24. Unlike ear piece 24 however, ear piece 25 is substantially shorter and is joined to a front portion 34 at a junction 33. Front portion 34 and ear piece 25 together form temple piece 14 which in similarity to temple piece 13 is secured to frame 11 by hinge 20. In further similarity, hinge 20 permits temple piece 14 to be folded inwardly against frame 11 for convenient carrying. In accordance with an important aspect of the present invention, front portion 34 defines an elongated interior channel 40 extending a substantial portion of its length and defining an outwardly facing notch 41. Front portion 34 further defines an aperture 42. An elongated rod 32, the structure of which is set forth below in greater detail, is carried within channel 40 and extends outwardly through aperture 42. Rod 32 terminates in a hinge 31 and defines an upwardly extending tab 35 which extends beyond channel 40 in front portion 34. A mirror 30 is coupled to hinge 31 and supported thereby upon rod 32. In accordance with the invention, mirror 30 is movable about hinge 31 with respect to rod 32. In the position shown in FIG. 1, eyeglasses 10 are configured to be worn by the user. Also in the position shown in FIG. 1, mirror 30 is supported in the position which provides rear viewing by the wearer of glasses 10.

Figure 2:
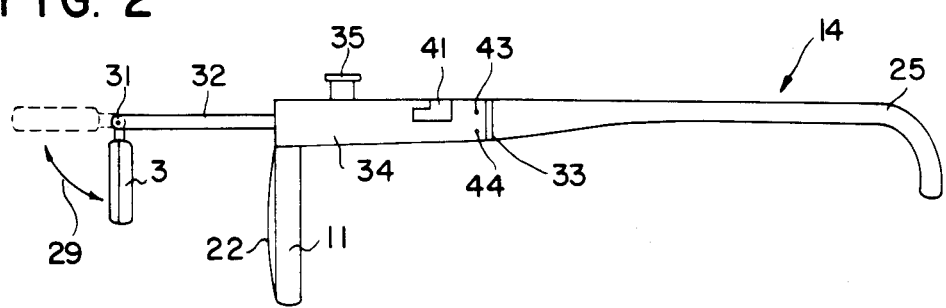
FIG. 2 is a side view of the present invention integral rear view mirror for eyeglasses in the extended position.

FIG. 2 sets forth a side view of eyeglass 10 in the position shown in FIG. 1 in which frame 11 supports lens 22 and is hingeably attached to temple piece 14. As described above, temple piece 14 includes ear piece 25 and front portion 34. As is also described above, ear piece 25 and front portion 34 are joined at junction 33. A pair of longitudinal retaining pins 43 and 44 extend through eyepiece 25 and front portion 34 to secure them in a rigid attachment shown below in greater detail. Tab 35 extends upwardly above front portion 34 and beyond channel 40. Rod 32 extends forwardly from front portion 34 and supports mirror 30 by hinge 31 in the position shown. In accordance with an important aspect of the present invention, mirror 30 may be pivoted about hinge 31 in the direction indicated by arrow 29 to assume the horizontal position shown as dashed line mirror 30A. The position of mirror 30 shown as dashed line position 30A forms the non-use position of the present invention rear view mirror in which no reflection is seen by the wearer of glasses 10 due to the mirror. As can be seen in FIG. 2, tab 35 and rod 32 are extended forwardly within channel 40.

Figure 3:
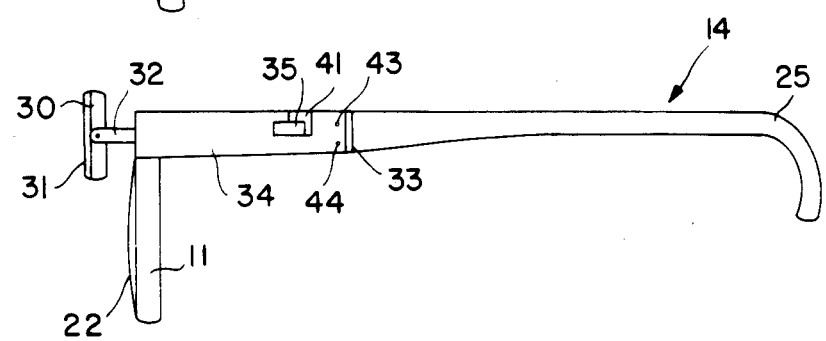
FIG. 3 is a side view of the present invention integral rear view mirror for sunglasses in the closed position.

FIG. 3 sets forth a side view of eyeglasses 10 set forth in FIG. 2 in which temple piece 14 comprising ear piece 25 and front portion 34 are supported with respect to frame 11 and lens 22 in the same positions shown in FIGS. 1 and 2. In contrast to the position of FIG. 2 however, FIG. 3 sets forth the position of the present invention rear view mirror in the withdrawn position. Accordingly, tab 35 has been moved rearwardly within channel 40 to notch 41. Tab 35 is then rotated 90 degrees to extend into notch 41 and assume the position shown in FIG. 3. Correspondingly, the rotation of tab 35 rotates rod 32 which in turn rotates hinge 31 and mirror 30. Thus, mirror 30 is locked in the position shown in FIG. 2 which as described below permits mirror 30 to be positioned so as to allow temple piece 14 to be folded inwardly against frame 11 for convenient carrying.

Figure 4:
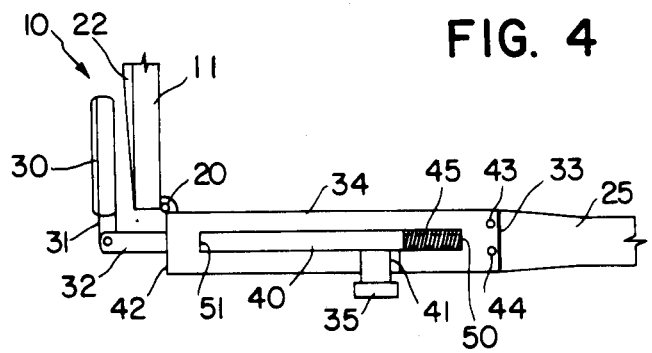
FIG. 4 is a top view of a portion of the present invention integral rear view mirror for sunglasses.
Figure 5:
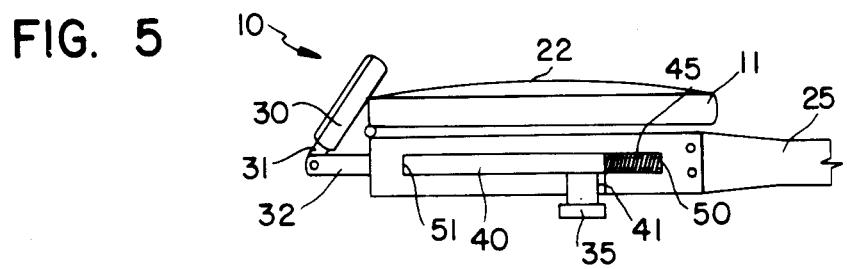
FIG. 5 is a top view of a portion of the present invention integral rear view mirror for sunglasses.

FIGS. 4 and 5 set forth the rear view mirror portion of the present invention in greater detail and as viewed from above. FIG. 4 sets forth the relative positions of temple piece 14 comprising ear piece 25 and front portion 34 in the position shown in FIG. 3. Accordingly, tab 35 is received within notch 41 and rod 32 is withdrawn into channel 40. As a result, mirror 30, which is pivoted inwardly 90 degrees in accordance with the rotation of tab 35, directly overlays lens 22 within frame 11. As mentioned, frame 11 and front portion 34 are secured by a hinge 20. In accordance with the invention, channel 40 defines an end 50 near junction 33 and an end 51 near hinge 20. As can be seen, end 51 forms a travel limit for tab 35 within channel 40 and thus limits the outward extension of rod 32. A spring 45 is received within channel 40 and is captivated between end 50 of channel 40 and end 52 of rod 32. As described below in greater detail, spring 45 is maintained within channel 40 in compression and thus urges end 52 and correspondingly rod 32 away from end 50 thus urging rod 32 to its extended position. In the locked position shown in FIGS. 4 and 5 however, the cooperation of tab 35 and notch 41 resists this spring force and maintains rod 32 in the locked position.

FIG. 5 sets forth the position of eyeglasses 10 shown in FIG. 4 with the exception that temple piece 14 is folded against frame 11 in the so-called carrying or storage position. In addition, and in accordance with an important aspect of the present invention, mirror 30 is pivoted to the position shown against frame 11 to facilitate the easy carrying of eyeglasses 10.

Figure 6A:
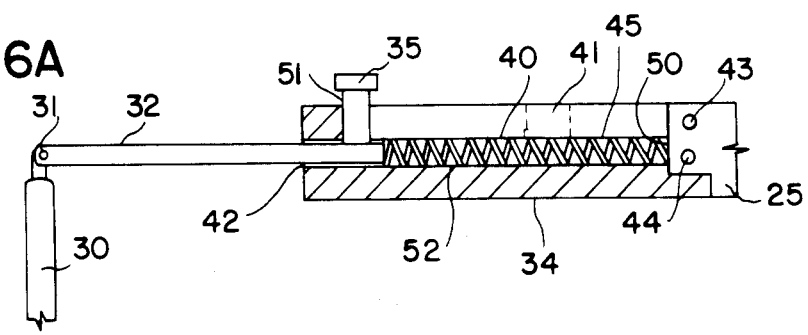
FIGS. 6A and 6B are section views of a portion of the present invention integral rear view mirror for eyeglasses taken along section lines 6—6 in FIG. 1.
Figure 6B:
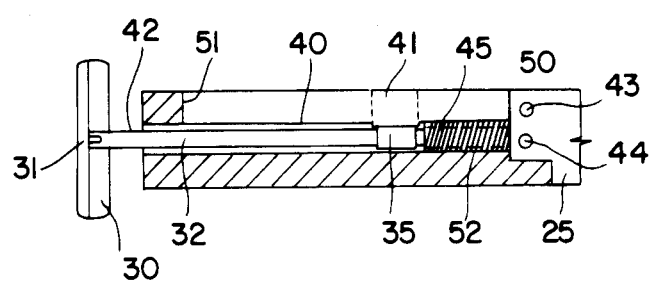

FIGS. 6A and 6B shows a section view of the present invention rear view mirror for eyeglasses taken along section lines 6—6 in FIG. 1. Specifically, FIG. 6A sets forth the section view of front portion 34 in which tab 35 is positioned in its forward position against end 51 of channel 40. Accordingly, in the position shown, rod 32 extends outwardly through aperture 42 its maximum distance and mirror 30 is supported as described above by hinge 31. As also described above, spring 45 is captivated within channel 40 between end 50 thereof and end 52 of rod 32. The compressive force of spring 45 maintains tab 35 against end 51. As is also seen, pins 43 and 44 pass through earpiece 25 and front portion 34 to secure a firm attachment at junction 33.

FIG. 6B sets forth rod 32 and tab 35 in the rotated position shown in FIG. 4. As can be seen, spring 45 is compressed to a greater degree than shown in the position of FIG. 6A due to the change in position of rod 32.

It will be apparent to those skilled in the art that while the present invention structure set forth in the foregoing descriptions utilizes a two piece assembly for temple piece 14, a single unitary molded temple piece or the like may be fitted with channel 40 and support rod 32 to function in accordance with the foregoing described invention.

While particular embodiments of the invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention.

That which is claimed is:

1. An integral rear view mirror assembly in combination with a pair of eyeglasses, said eyeglasses having a pair of lenses, a frame, a pair of temple pieces and hinge means coupling said temple pieces to said frame, an elongated channel defined in one of said temple pieces having a closed end and an open end proximate said hinge means and a notch therebetween;

said mirror assembly comprising an elongated rod having a first end defining a first mirror hinge member, a second end, and an extending lock member intermediate said first and second ends; said elongated rod being received within said temple channel such that said first end extends outwardly from said channel through said open end and is moveable between extended and withdrawn positions;

said mirror assembly further comprising a mirror having a second mirror hinge member cooperating with said first mirror hinge member to pivotally secure said mirror to said first end of said elongated rod; and a spring received within said channel interposed between said second end of said elongated rod and said closed end of said channel urging said elongated rod toward said extended position.

2. An integral rear view mirror as set forth in claim 1 wherein said mirror is pivotable between a viewing position generally parallel to said lenses and a non-viewing position generally perpendicular to said lenses.

3. An integral rear view mirror as set forth in claim 2 wherein said lock member is received within said notch to maintain said elongated rod in said withdrawn position.

4. An integral rear view mirror as set forth in claim 3 wherein said notch and said lock member are positioned with respect to said mirror such that said lock member rotates said elongated rod and said mirror as it enters said notch.

5. An integral rear view mirror as set forth in claim 4 wherein said lock member defines a front edge and wherein said notch further defines a recess configured to receive said front edge.

6. An eyeglass comprising:
a frame;
a pair of lenses supported within said frame;
a pair of temple pieces each defining an elongated channel, a notch and a front opening;
a pair of hinges securing said temple pieces to said frame;
a pair of elongated rods supported within said elongated channels within said temple pieces in extended or withdrawn positions and having portions extending outwardly therefrom through said front openings and defining lock tabs;
a pair of mirrors;
a pair of mirror hinges pivotally attaching said mirrors to said outwardly extending portions of said elongated rods; and
a pair of springs received within said channels and captivated therein to urge said elongated rods to their extended positions.

* * * * *